UNITED STATES PATENT OFFICE 2,506,226

STAINLESS STEEL CATALYST FOR HYDROCARBON SYNTHESIS

Edwin T. Layng, New York, N. Y., assignor to Hydrocarbon Research, Inc., New York, N. Y., a corporation of New Jersey No Drawing. Application April 12, 1946,
Serial No. 661,868

3 Claims. (Cl. 260—449.6)

The present invention relates to the synthesis of hydrocarbons as well as oxygenated hydrocarbons by means of the catalytic reduction of carbon oxides with hydrogen and is more specifically concerned with the foregoing process operating through the agency of an iron catalyst.

It has been known for some time that so-called synthesis gas containing substantial proportions of hydrogen and carbon monoxide can be readily converted to hydrocarbons of desired properties in the presence of a catalyst comprising a metal of the iron group such as iron, nickel, and cobalt, preferably together with certain activators or promoters such as alkali metal or alkaline earth metal compounds or alumina ($Al_2O_3$). The reaction which is highly exothermic in character is necessarily conducted under conditions of careful temperature control such as to maintain the optimum temperature level dependent on the particular catalyst and the desired character of the products to be produced. More or less of a fraction of oxygenated hydrocarbons may also result depending on the selection of favorable temperatures and pressures.

The initial attempts to use catalyst comprising essentially iron led to the conversion of about 30–40% of the carbon monoxide to carbon dioxide. For economic reasons it is obviously of advantage to operate the process substantially in accordance with the equation:

$$2H_2 + CO = CH_2 + H_2O$$

The process, carried out in the presence of cobalt or nickel catalyst, evidences a general conformance to this type of reaction. On the other hand the tendency to the production of carbon dioxide in lieu of water vapor when using iron catalyst has formed a serious objection to this process. This objection has now been largely overcome by various expedients including conducting the reaction in stages with the intermediate removal of water vapor, use of high space velocities and relatively active catalyst maintained under conditions of uniform temperature control, by recycling gaseous materials adapted to suppress the formation of carbon dioxide, and by other means.

In accordance with the present invention it has been discovered that the formation of carbon dioxide in the catalytic reduction of carbon monoxide with hydrogen can be largely and in most instances substantially completely inhibited when carrying out the reaction in the presence of an iron catalyst comprising iron in the form of an alloy with other metal or metals which confer corrosion resistance substantially equivalent to that of stainless steels. It is important that the corrosion resisting catalyst be essentially or predominately metallic iron in combination with other metals which are true alloying constituents. At least the combination must possess corrosion resisting properties equivalent to those of a true alloy as compared with ordinary mixtures or coprecipitated combinations wherein this significant property is absent.

The preferred class of catalysts suitable for use in accordance with the present invention is the class of stainless steels itself. These alloys, while including a wide field of combinations of various alloying elements, are characterized uniformly by an alloy combination which is predominately iron with a preferred minimum of about 12% chromium. In some instances, however, where optimum corrosion resistance is not required, the chromium content may fall as low as 4 or 5%. On the other hand the chromium content may go as high as 20 or 30%. The most common additional alloying element in compounds of this character is nickel, normally in proportion of 4 to 8% of the total alloy. Various other alloying elements occur either alternatively or in addition to the nickel but these are not critical either for the broad purpose of stainless steel or for the purpose of the present invention.

A typical illustrative alloy of this character comprises 18% chromium, 8% nickel and the remainder iron. Another may comprise 12% chromium, 4% nickel and the remainder iron, together with minor amounts of other alloying metals. Products of this character normally exhibit no tarnishing or heat tinting at temperatures up to 650° F. in strongly oxidizing gases, but are capable of carbiding or carburizing on their surfaces in the presence of suitable carbiding materials such as synthesis gas.

Another class of iron alloys broadly adaptable for use in accordance with the present invention embodies the so-called class of silicon irons, likewise highly resistant to corrosion and containing in the neighborhood of 13 to 16% of silicon. Normally this product is found commercially in the form of a cast iron. However, to be suitable for use in accordance with the present process, it must be substantially free of the known catalyst poisons such, for example, as sulfur and phosphorus and their compounds.

The process may be carried out in any conventional type of reactor constructed to permit passage of a mixture of the reactant gases through a bed of the catalyst at controlled, predetermined temperatures and under the desired optimum pressure, the effluent reaction products being collected and treated for recovery or further processing. As is known, this type of apparatus normally includes a reactor adapted to support the catalyst bed in heat exchange relationship to adequate cooling surfaces which remove exothermic heat of reaction at operating temperature.

It is most advantageous however to operate in accordance with the known process of fluidization wherein the catalyst in the form of finely divided powder is maintained in a so-called fluidized state by the flow of incoming reactants. In other words the reactant gases move upwardly through the particles of powder at such a rate as to maintain the particles in suspension and yet permit slippage of the particles against the up-flowing gas stream. As is known, when operating in this manner, the particles are given a rapid and vibrating movement similar in the aggregate to the action of a boiling body of liquid.

Advantageously the rate of gaseous flow may be so adjusted with respect to the catalyst particle size that the catalyst mass assumes a state of dense phase fluidization with a more or less clearly defined upper surface in the nature of a pseudo-liquid level.

Alternatively the catalyst particles may be largely or fully entrained in the gases. In either case, however, the continuous mass of moving catalyst particles suspended in the reactant gases exhibit a rate of heat transfer to adjacent cooling surfaces which is characteristic of a good liquid heat transfer medium whereby temperatures may be readily held uniformly throughout the mass at or near the pre-selected optimum.

It is believed that the fluidizing technique is of particular advantage in connection with the use of the new catalysts disclosed in accordance with the present invention because of the advisability of operating with a fine state of catalyst subdivision where the resulting large amount of available surface area materially increases the overall activity of the catalyst. In other words, operating for example with a finely comminuted stainless steel having little or no internal active surface area available for contact with the reactant gases, it is desirable to use powders of less than 100 and preferably less than 200 mesh size. In fact even greater degrees of subdivision are quite advantageous and powders passing a 325 mesh screen are to be preferred where high rates of conversion and good yields approaching optimum are desired. Moreover, it will be obvious from the foregoing that use of the fluidizing technique is additionally advantageous and necessary in many cases in order to permit removal of excess heat and the desired uniform control of reaction temperature at the resulting high reaction rate.

The catalyst powder may be employed with or without the addition of conventional promoters and activators referred to above. Under conditions where precise temperature control is available, such addition agents may be largely or entirely eliminated. On the other hand the catalyst powder may advantageously contain from 0.6 to 2.0% or even up to as high as 5% of an alkali metal or alkaline earth metal compound, such for example, potassium oxide ($K_2O$), sodium oxide ($Na_2O$), or compounds of magnesium or barium such as magnesium carbonate ($MgCO_3$). Other suitable promoters are compounds of titanium, silicon, uranium, and molybdenum. The iron alloy powder may advantageously be combined with the additional promoters or activators where desired by mixing the particles with the activating additions preferably in the form of a solution of a salt which may be deposited upon the catalyst powder by precipitation or drying. Thus, for example, the finely powdered iron alloy may be intimately mixed with a weak aqueous solution of sodium carbonate sufficient to bring the alkali content to about 1½% expressed on the basis of $Na_2O$ percent of the total weight of catalyst. This may be followed by drying the powder slowly in a current of warm dry air and then by conditioning in a catalyst reaction zone.

It is particularly desirable to break in or condition the catalyst prior to initiation of the synthesis of hydrocarbons. This so-called conditioning involves a start-up period normally occupying 2 to 5 hours during which initial, undesired reactions including formation of methane and carbon dioxide, are gradually eliminated and the reaction approaches an equilibrium condition with the formation of the desired products. More specifically it involves passage of synthesis gas through the fresh catalyst at about reaction temperature and pressure and at a linear velocity approximating that to be followed in normal operation of the process. During this period the synthesis gas presumably conditions the catalyst surface in some manner as by carbiding or otherwise. Completion of the step is indicated by settled and uniform character of the effluent reaction products. Thereafter the synthesis process is operated normally for the production and recovery of the desired reaction products.

The temperature of reaction may vary widely within the range of 550 to 700° F. depending upon the specific products required. The pressure may vary from atmospheric or below upwardly to 300 pounds per square inch gauge or more, in some instances as high as 1000 pounds. In general higher temperatures tend to result in a predominance of relatively lower boiling hydrocarbons although excessive temperatures may tend toward undue catalyst deterioration. For the production of hydrocarbons predominately boiling in the gasoline range, a temperature of about 600° F. and a pressure of about 200 pounds per square inch gauge is to be preferred in most instances. It will be understood however that the precise conditions of operation will depend in each instance upon the specific catalyst employed and are therefore best determined by experiment.

The following example is intended to illustrate more specifically one preferred embodiment of the present invention by way of indicating the advantages thereof. In accordance with this example a synthesis gas containing about 58% hydrogen, 29% carbon monoxide, 8% carbon dioxide and 5% methane is passed at a space velocity of 1000 v./hr./v. and an inlet linear velocity of about 1½ feet per second through a mass of catalyst comprising powdered stainless steel having a composition consisting of 18% chromium, 8% nickel and the remainder iron. The powdered material may have been prepared by any known means of comminution including grinding or ball milling of the original alloy preferably followed by magnetic separation of any non-metallic particles. Grinding, for example, is carried to a degree where all of the particles pass through a 200 mesh screen and at least 85% pass a 325 mesh screen. Then there is added and uniformly distributed through the powder, a five percent aqueous solution of sodium carbonate in sufficient quantity to leave on the iron alloy powder about 2% by weight of sodium carbonate. The mixture is slowly dried in a current of warm air until the last traces of water are removed, and the mass placed in a suitable reactor.

Under the conditions of reactant flow indicated above the catalyst is maintained in a state of dense phase fluidization. With adequate and well-designed cooling jackets and internal cooling surfaces contacting the mass, it is possible to maintain uniformly a temperature within about 5° above or below 600° F. throughout the reaction zone. The synthesis gas passes through the mass at this temperature and a pressure of 200 pounds per square inch gauge. The effluent reaction gases are passed through a cyclone separator to remove small amounts of entrained catalyst, and are cooled to room temperature to separate fixed gases from water vapor and liquid hydrocarbons. After an initial start-up period of four hours the yield of hydrocarbons and water vapor becomes settled at a value closely approximating the theoretical yield indicated by the equation above with substantially no production of carbon dioxide. The catalysts of this invention make it possible to carry out the synthesis of hydrocarbons with the formation of not more than about 5%, and usually less than 3%, of carbon dioxide.

While the present invention has been specifically disclosed in connection with single stage operation, it is not so limited but may be carried out under conditions wherein partial conversion of the synthesis gas occurs in each successive stage with intermediate removal of water vapor and/or other reaction products. So also the invention contemplates, where desired, recycling of reaction gases through one or more of the stages, with or without removal of some reaction products prior to recycling.

Moreover the invention, in its broadest aspect, may follow the technique of fixed bed operation or any other known physical or mechanical expedients whereby the reactants are brought into contact with the catalyst under reaction conditions. As indicated above the linear velocity of reactant flow, as well as the space velocity and the other conditions of reaction will necessarily vary from those indicated above, depending on the specific catalyst and the preferred technique of operation. While I have disclosed that so-called stainless steels, and silicon iron containing at least about 12% silicon, possess the required degree of corrosion resistance characteristic of iron catalysts exhibiting the important, novel advantage of the present invention, it will be understood that these advantages are likewise available in connection with all other iron catalysts active for the catalytic reduction of carbon oxides with hydrogen, and having substantially the corrosion and staining resistance of stainless steel.

Various other modifications of the invention will occur to those skilled in the art upon careful consideration of the foregoing disclosures, without departing from the spirit and scope thereof and accordingly only such limitations should be imposed as are indicated by the following claims.

I claim:

1. In the catalytic reaction of a mixture of carbon monoxide and hydrogen for the production of hydrocarbons predominantly boiling in the gasoline range, the improvement which comprises passing said mixture of carbon monoxide and hydrogen in contact with a finely divided solid particle catalyst comprising stainless steel containing approximately 18% chromium and 8% nickel activated by a minor proportion of a sodium compound, maintaining reaction temperature at about 600° F. and reaction pressure at about 200 pounds per square inch, withdrawing gasiform products of reaction from contact with the catalyst after substantial conversion into normally liquid hydrocarbons has occurred, and recovering such normally liquid hydrocarbons from the withdrawn products of reaction.

2. In the catalytic reaction of a mixture of carbon oxide and hydrogen for the production of liquid hydrocarbons, oxygenated hydrocarbons and the like, the improvement which comprises passing said mixture of carbon oxide and hydrogen into contact with a solid particle catalyst comprising stainless steel containing from about 4 to about 30 per cent chromium, and from about 4 to about 8 per cent nickel at a temperature in the range of from 550 to 700° F. and at a pressure less than about 1,000 pounds per square inch, maintaining said contact until a substantial degree of conversion has occurred into normally liquid products of reaction, and recovering such products of reaction from the effluent gases.

3. The method defined in claim 2 wherein the stainless steel contains approximately 12 per cent chromium and 4 per cent nickel.

EDWIN T. LAYNG.

REFERENCES CITED

The following references are of record in the file of this patent:

UNITED STATES PATENTS

| Number | Name | Date |
|---|---|---|
| 2,109,118 | Nauman | Feb. 22, 1938 |
| 2,287,891 | Linckh | June 30, 1942 |
| 2,345,957 | Wirth et al. | Apr. 4, 1944 |
| 2,347,682 | Gunness | May 2, 1944 |
| 2,360,787 | Murphree | Oct. 17, 1944 |

FOREIGN PATENTS

| Number | Country | Date |
|---|---|---|
| 293,572 | Great Britain | July 12, 1928 |
| 458,035 | Great Britain | Dec. 11, 1936 |

OTHER REFERENCES

Frolich et al., "Industrial and Engineering Chemistry," vol. 20, pages 354–59 (1928).